Jan. 20, 1970    J. M. BOOE    3,491,269
CONSTRUCTION FOR NON-HERMETIC SEALED
SOLID ELECTROLYTE CAPACITOR
Filed Aug. 21, 1967

INVENTOR
JAMES M. BOOE
BY
ATTORNEY

United States Patent Office 3,491,269
Patented Jan. 20, 1970

3,491,269
CONSTRUCTION FOR NON-HERMETIC SEALED SOLID ELECTROLYTE CAPACITOR
James M. Booe, Indianapolis, Ind., assignor to P. R. Mallory & Co., Inc., Indianapolis, Ind., a corporation of Delaware
Filed Aug. 21, 1967, Ser. No. 662,161
Int. Cl. H01g 9/00, 1/00, 3/00
U.S. Cl. 317—230       11 Claims

ABSTRACT OF THE DISCLOSURE

A solid or dry non-hermetically sealed electrolytic capacitor including a getter or desiccant means for further stabilizing the electrical properties of the capacitor.

---

The present invention relates to non-hermetically sealed capacitors containing matter or a composition of matter for stabilizing the electrical properties of the capacitors of both the sintered powder type and the foil type. For example, it is known that the electrical properties of solid electrolyte capacitors having a porous anode fabricated from a film-forming or anodizable metal such as tantalum, aluminum, niobium, titanium, zirconium, hafnium and the like and having a solid semiconductive electrolyte such as manganese dioxide disposed thereover vary due to the presence of moisture and acidic gases within the housing. The epoxy end seal generally used with capacitors of this type is relatively porous so that after the passage of time, moisture may permeate the closure thereby affecting the electrical properties of the capacitor. In addition, the component parts of the capacitor may include contaminates which may evolve moisture and/or acidic gases such as carbon dioxide and moisture when the capacitor is subjected to elevated operational temperatures in excess of 100° C. The evolved acidic gases also adversely affect the electrical properties of the capacitor. Generally, a relatively large void area appears between the epoxy end seal and the anode to allow for the presence of evolved gases and for processing reasons.

The non-hermetic sealed solid electrolyte capacitor is not as reliable as or as stable under extremes of temperature as is a hermetically sealed capacitor. However, there are applications where reliability versus cost and/or where the capacitor is not subjected to extremes of temperature which lends to the use of a non-hermetically sealed capacitor.

It has been found that capacitors having an anode fabricated from a film-forming metal such as tantalum, and in particular, tantalum capacitors having a low voltage rating and a high capacitance rating, experience rapid changes in the electrical characteristics with a change in the humidity of the ambient air. For example, if the humidity of the ambient air increases from an initial humidity, the capacitance and the dissipation factor increase and when the humidity decreases to about its initial value, the capacitance and dissipation factor of the capacitor decrease to substantially their original values. The cause for the variation in the electrical properties of the film-forming anode capacitor is not known, however, it is thought that the semiconductive electrolyte, such as manganese dioxide, does not cover the oxide film dielectric formed on the anode in toto. If such be the case, the capacitor probably is not utilizing the entire potential capacitance thereof. It is thought that when the moisture content of the ambient air is increased and when additional moisture comes in contact with the surface of the anode and/or permeates the intercommunicating voids of the anode, sufficient electrolyte-like material is formed as a result of the moisture combining with carbon dioxide in the air or ionizable material in the anode such as in the semiconductive layer of manganese dioxide to cover the uncovered areas of the tantalum oxide film thus causing the newly covered areas to exhibit capacitance not exhibited herebefore. It is thought that the additional capacitance found under the newly formed electrolyte-like material causes the increase in the capacitance of the capacitor. In addition, it is thought that the newly formed electrolyte-like material has a high resistivity which causes the capacitor to exhibit an increase in the dissipation factor.

Regardless of the reasons for the varations in the electrical properties of the capacitor, it has been found that including a getter means within the non-hermetic housing contributes to the stabilization of the electrical properties of the capacitor. It has been found that in incorporating a powerful desiccant agent, such as one of the alkaline earth oxides within the housing, substantially all of the water and water vapor contained within the housing will combine with the alkaline earth oxide rendering the ambient air within the housing substantially moisture free. The substantially moisture free environment contained within the housing serves to stabilize the electrical properties of the capacitor device. It was also found that the desiccant agent absorbed volatile acidic compounds evolved by partial thermal decomposition of the binder in the silver paint on the anode, the solder flux residue, the flux solvent, residual traces of the electroformation electrolyte and the like at elevated operating temperatures.

The alkaline earth oxide desiccants have several properties which are important. Several of the most important of these properties are that they are solid materials rather than liquids, they are electrically nonconductive and remain so even after hydration to a hydroxide state, that they are among the most powerful desiccants presently available, that they are alkaline in nature and as such possess the property of sequestering deleterious acidic gases and vapors such as carbon dioxide and that when subjected to elevated temperatures they retain their desiccating property.

Several other types of desiccant agents are known and have proven to be effective at operating temperatures of up to about 65° C. Examples of the several other types of agents are, silica gels, molecular sieves, activated alumina and the like. However, the above-mentioned desiccant agents release substantially all of previously absorbed moisture when the capacitor device containing one of the above-mentioned desiccant agents is operated at an operating temperature in excess of about 65° C.

It was found that by introducing a powdered alkaline earth oxide of a substantially uniformly blended mixture of an alkaline earth oxide and a compatible viscous liquid which becomes, upon solidifying, an elastomeric solid into the sealed housing, the electrical properties of the solid electrolyte capacitor were more stabilized.

It was found that the semiconductive layer of manganese dioxide and the alkaline earth oxide particles or the alkaline earth oxide dispersed in an elastomeric solid had no adverse effect on the physical and the chemical properties of each other. However, if the alkaline earth oxide is dispersed in the elastomeric matrix, it is important that the polymerization reaction thereof should not liberate deleterious amounts of moisture since the liberated moisture will react with the alkaline earth oxide thereby affecting the desiccating property of the desiccant agent. It was found that silicone rubber and silicone potting resins do not liberate water during the polymerization reaction thereof. When silicone rubber is utilized to provide an elastomeric medium for the desiccant, vulcanization is effected by means of an organic peroxide which removes the hydrogen atoms from the methyl groups of adjacent siloxane molecules thus effecting cross-linking at these points. Similarly, when using potting resins and room temperature curing silicone rubber, cross-linking is effected by reacting silane hydroxy groups with methyl triethoxysilane in the presence of a metal organic catalyst such as for example, tribulyltin dilaurate, or platinum compounds.

Therefore, it is an object of the present invention to provide a getter or desiccant means that may be easily and conveniently introduced into a housing for a solid electrolyte capacitor without the necessity of altering the position of the components within the housing or a modification of the housing to accommodate the getter or desiccant means.

Another object of the present invention is to provide a getter or desiccant means for solid electrolyte capacitor which may physically contact the anode of the capacitor and which does not chemically react with or otherwise deleteriously affect the solid electrolyte formed over the anode of the capacitor.

Another object of the present invention is to provide a getter or desiccant means for solid electrolyte capacitor that has very high resistivity after absorbing large amounts of moisture, water vapor and acidic gases.

Yet another object of the present invention is to provide a getter or desiccant means for solid electrolyte capacitor that does not dehydrate when subjected to operating temperatures as high as 200° C for periods of time in excess of several thousand hours.

Yet still another object of the present invention is to provide a getter or desiccant means for solid electrolyte capacitor having an alkaline earth metal oxide randomly dispersed in an elastomeric matrix or binder that expands with the alkaline earth oxide as the oxide absorbs water vapor or moisture thereby substantially negating possible rupture and/or flaking of the elastomeric matrix or damage to the anode or other members of the construction.

A further object of the present invention is to provide a getter desiccant means for solid electrolyte capacitor having an elastomeric matrix which substantially covers the exposed portions of the anode and fills the void spaces between the anode and the side walls of the housing to thereby sequester moisture and other deleterious gases which may be present within the housing and/or evolved during the operation of the capacitor and protect the anode of the capacitor from possible shock and/or vibration.

Yet another object of the present invention is to provide an elastomeric getter or desiccant means for a solid electrolyte capacitor wherein the elastomeric matrix retards the rate at which alkaline earth metal oxide reacts with water vapor, moisture and acidic gases.

A further object of the present invention is to provide an elastomeric getter or desiccant means for solid electrolyte capacitor wherein the elastomeric matrix is cast as a liquid into the housing which allows convenient location thereof in the housing and which subsequently polymerizes without releasting moisture or deleterious gases thereby forming an elastomeric solid having dispersed throughout particles of an alkaline earth oxide.

Yet another object of the present invention is to provide a getter or desiccant means for solid electrolyte capacitor which does not liberate a gas or gases when water vapor or other deleterious gases react with the getter or desiccant means.

Yet still another object of the present invention is to provide a getter or desiccant means for solid electrolyte capacitor which does not liquify and which does not become electrolytic in nature when the getter or desiccant means absorbs moisture and acidic gases.

A further object of the present invention is to provide a getter of desiccant means for solid electrolyte capacitor which is simple in construction, reliable, economical to manufacture, light-weight and small in physical size.

The present invention in another of its aspects, relates to the novel features of the instrumentalities of the invention described herein for teaching the principal object of the invention and to the novel principles employed in the instrumentalities whether or not these principles may be used in the said object and/or in the said field.

With the aforementioned objects enumerated, other objects will be apparent to those persons possessing ordinary skill in the art. Other objects will appear in the following description, appended claims and appended drawings. The invention resides in the novel construction, combination, arrangement and cooperation of elements as hereinafter described and more particularly as defined in the appended claims.

The appended drawings illustrate embodiments of the present invention constructed to function in a most advantageous mode devised for the practical application of the basic principles in the hereinafter described invention.

Generally speaking, the present invention relates to a solid electrolyte capacitor having a getter or desiccant means for further stabilizing the electrical properties of a non-hermetically sealed capacitor. The getter means is located within the housing and sequesters fluid materials such as water vapor and acidic gases in the container. The getter means may be comprised of alkaline earth oxide particles randomly dispersed in an elastomeric matrix. The getter means may be in intimate contact with the semiconductive layer overlying the oxide film dielectric formed on the anode of the capacitor.

Figure 1:
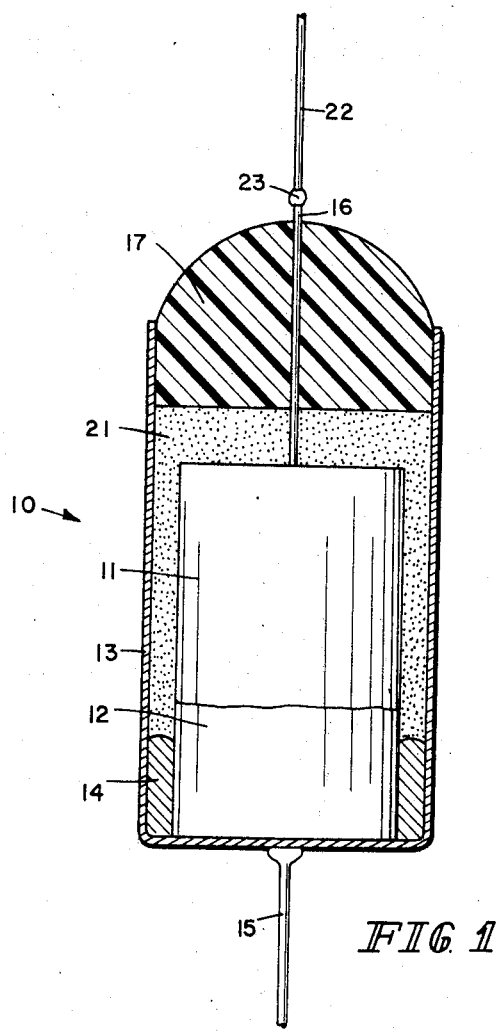
FIGURE 1 is an enlarged partial cross-sectional view of a solid electrolyte capacitor illustrating the anode thereof substantially covered with a powdered alkaline earth metal oxide.

Referring now to the enlarged partial cross-sectional view illustrated in FIGURE 1 of the drawing, a capacitor device is indicated by the reference numeral 10. The capacitance device includes a sintered, porous pressed powdered metal anode or pellet 11 selected from the group of film-forming or anodizable metals consisting of tantalum, aluminum, niobium and the like including a multiplicity of intercommunicating voids. (not shown) During fabrication thereof, the pellet is subjected to anodization or electroformation by passing a direct current from the pellet through an electrolyte in which the pellet is immersed to a tank containing the electrolyte. The voltage applied ranges from about 10–300 volts depending on the thickness of the anodized film desired. The higher the voltage used, the thicker the resulting film and the lower the resulting capacitance. The electrolyte solution may be an aqueous solution of sulfuric acid, nitric acid, phosphoric acid and the like. The pellet is impregnated with a suitable solution of manganese nitrate and is heated in air for a sufficient length of time and at a sufficient temperature to effect the pyrolytic conversion of the manganese nitrate to manganese dioxide. A reanodization step may follow each or some of the pyrolysis steps. The reanodization step and the pyrolytic conversion step may be repeated as many times as necessary in order to obtain a pellet having the desired electrical characteristics.

A first conductive coating of colloidal graphite is applied to the manganese dioxide and dried. A second conductive coating such as silver powder in a suitable organic binder to form a paint or other suitable cathode material is applied to the graphite covered surface of the anode by dipping, spraying or the like of the anode with silver paint or the like. The graphite coating and the silver coating serves as a means of coupling the manganese dioxide semiconductive layer to the cathodic terminal of the housing. Since the silver paint coating serves no other purpose than to provide a cathodic termination for the anode, there is no apparent necessity for completely covering the anode with the silver paint although it is recognized that the anode may be completely covered with this or similar material.

A container or can 13 having a closed end and an open end has droplets of solder 14 placed in the closed end of the can in a sufficient amount to securely retain the anode 11 therein upon solidification. The anode 11 has its silver paint coated end 12 partially immersed into the molten droplet of solder so as to seat the anode in the container in such a manner that the peripheral sides of the anode are substantially equally spaced from the inner wall of the container. The container 13 is fabricated from any suitable solderable cathodic material such as tinned brass or the like. The container 13 may also have attached thereto an axial terminal lead 15 for providing a convenient extension of the cathodic termination of the capacitor. It is recognized that for certain applications the terminal leads 15 may be eliminated and that the container 13 would serve as the cathodic termination for the capacitor.

An anode riser 16, fixedly connected to the anode, projects through epoxy end seal 17 and is welded at 23 to a solderable lead wire 22 generally made of nickel or the like. The open end of container 13 is closed by epoxy end seal 17. The joints between the end seal 17 and the container are sufficiently tight so as to provide an adequate seal therebetween.

Prior to sealing the container 13, a predetermined amount of a powdered alkaline earth oxide 21 is introduced thereinto so as to substantially fill void areas existing between the periphery of the anode 11 and the inner wall of the can 13. The powdered alkaline earth oxide does not adversely affect the physical or chemical properties of the manganese dioxide semiconductive layer or of the silver paint material. The alkaline earth oxide serves the dual function of sequestering moisture and acidic gases evolved from contaminants generally present within the housing from physical handling, the binder for the silver paint on the anode, the solder flux residue, the solder flux solvent and the like. It is known that when the capacitor is subjected to elevated operating temperatures, such as in excess of about 100° C., volatile acidic gases may be evolved by the organic materials and in particular the binder for the silver paint. As disclosed hereinbefore, the evolved organic acid compounds have an adverse effect on the electrical properties of the capacitor. The powdered alkaline earth oxide 21 sequesters and neutralizes the acidic gases and renders said gases inactive as far as the operation of the capacitor is concerned. It is seen, therefore, that not only does the powdered alkaline earth desiccant means sequester and retain moisture, but it also sequesters, retains and reduces to an inactive state acidic gases evolved during the operation of the capacitor device. As long as unconverted alkaline earth oxide particles remain within the housing, the particles will combine with water vapor and acidic gases as each are formed during the operation of the capacitance device.

Figure 2:
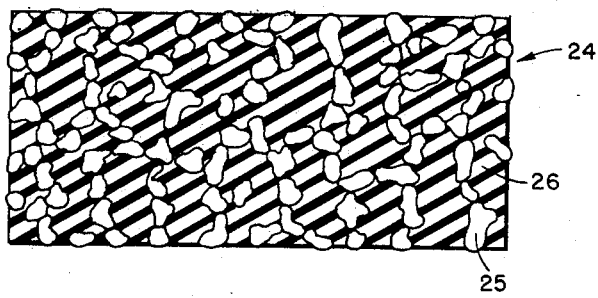
FIGURE 2 is an enlarged cross-sectional view of an alkaline earth metal oxide dispersed in an elastomeric solid medium.

FIGURE 2 of the drawing illustrates an enlarged cross-sectional view of an elastomeric getter or desiccant means 24 having alkaline earth metal oxide particles 25 randomly dispersed in an elastomeric matrix 26. The alkaline earth oxide is selected from the group consisting of calcium oxide, strontium oxide and barium oxide. The matrix 26 is selected from elastomers such as the silicone elastomers and more particularly the silicone rubbers, the silicone potting resins and the like. It was found that the matrix should have an elastomeric characteristic so as to substantially prevent flaking and/or rupturing there-of as the alkaline earth oxide expands during absorption of the water vapor and acidic gases. More importantly, a non-elastomeric matrix may rupture the fragile manganese dioxide coating on the anode upon expansion, thereby rendering the capacitor substantially inoperative for its intended purpose.

It was found that the rate at which the water vapor and acidic gases were absorbed by the elastomeric getter or desiccant means was decreased moderately over the rate of the powdered alkaline earth oxide without an elastomer matrix. However, the elastomer matrix did not impair the extent to which the alkaline earth oxide will absorb moisture or acidic gases evolved in the hermetic enclosure. For example, 4.5 grams of barium oxide powder placed in a still air environment having 67 percent relative humidity increased about 6 percent by weight in about 2 hours and increased about 12 percent by weight in about 6 hours. When the same amount of barium oxide powder was dispersed in an elastomeric matrix about a 6 percent by weight increase was registered in about 7.5 hours and about a 12 percent by weight increase was incurred in about 18 hours, thereby showing that the elastomeric matrix does retard the rate at which the alkaline earth oxide absorbs moisture but does not affect the amount of moisture that can be absorbed by the alkaline earth oxide, however, the absorption rate of the elastomeric desiccant means falls within a very useful range. alkaline earth oxide, the remainder an elastomeric matrix provided a satisfactory desiccant means. Less than 5 per- It was found that about 5–85 percent by weight of the cent by weight of the alkaline earth oxide the remainder an elastomer matrix provided a desiccant means having less than ideal desiccating capacity in relation to the size of the desiccant means. Exceeding about 85 percent by weight resulted in an elastomeric desiccant means which was frangible and therefore offered no tangible benefits over those derived from using a desiccant in the loose powder form such as shown in FIGURE 1.

A trace to about 1 percent by weight submicron silicon dioxide or other suitable material may be used in the matrix so as to maintain the alkaline earth oxide suspended in the elastomeric matrix when the matrix is in the liquidous phase. A particle size greater than 80 mesh may be used but frequent or continuous agitation of the liquid is required to maintain the oxide dispersed in a reasonably uniform manner throughout the elastomer phase.

Referring again to FIGURE 2, it will be noted that the alkaline earth oxide particles 25 are dispersed in a random fashion throughout the solidified elastomer matrix. If the metal oxide particles are in an abutting relationship as in the case with a loose powder shown in FIGURE 1, the rate of absorption of water vapor and acidic gases is at a rate higher than if the individual particles are dispersed in a matrix as shown in FIGURE 2. A coating of the elastomer film over the individual particles contained within the elastomeric matrix will reduce the transferral of absorbed moisture and acidic gases from a particle exposed to the ambient air and embedded in or carried by the elastomeric matrix. By way of example, the alkaline earth particle at the surface of the desiccant means will initiate absorption of water vapor and acidic gases before an adjacent particle embedded in the matrix will initiate absorption thereof. It is thought that the water vapor and acidic gases absorbed by a surface particle will, to some degree, be transferred to an adjacent particle thereby significantly reducing the rate at which the two particles absorb water vapor and acidic gases when compared to the rate at which the adjacent loose particles absorb water vapor and acidic gases. It is thought that this "chain reaction" phenomenon occurs throughout the elastomeric desiccant means.

Figure 3:
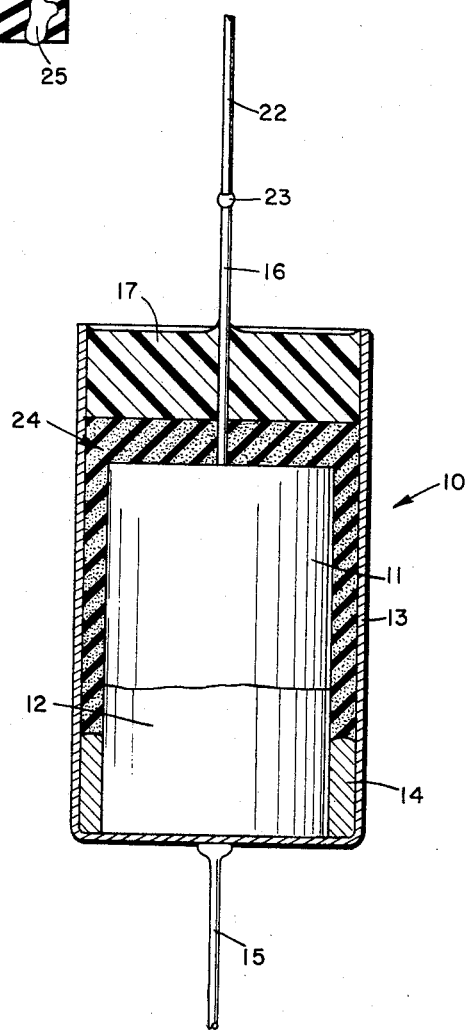
FIGURE 3 is an enlarged partial cross-sectional view of a solid electrolyte capacitor having the anode thereof substantially covered with an elastomeric desiccant means.

FIGURE 3, the drawing shows substantially the same capacitor device as shown in FIGURE 1. FIGURE 3 illustrates the pellet or anode 11 substantially surrounded by the elastomeric desiccant means 24 which was introduced into housing as a liquid and allowed to polymerize therein so as to form an elastomeric solid having substantialy the same random dispersion of the oxide particles as shown in enlarged cross-sectional view of FIGURE 2. In addition to absorbing water vapor and acidic gases, the elastomeric matrix has the additional function of protecting the anode from shock and/or vibration.

The following will further serve to exemplify the inventive aspects of the present invention:

A capacitor, similar to the capacitor shown in the drawing and having a nominal capacitance rating of 100 mf., was stored for several hours in air having a very high relative humidity of about 100%. The capacitor was removed to a normal environment and the electrical characteristics measured and found to be as follows:

Capacitance _____ mf__119
Dissipation factor _____ percent__1.9

A getter or desiccant slurry composition comprising 2 parts by weight of barium oxide and 1 part by weight of a silicon potting and encapsulating resin was formed. The slurry was poured over and around the anode to cover the anode in the manner shown in FIGURE 3. The slurry was subjected to heat so as to convert the slurry to an elastomeric solid. A liquid epoxy resin was poured over the getter means which was heated to cause it to solidify and bond to the container and the anode riser. The folowing electrical measurements were made after about 96 hours stand at room temperature with the desiccant sealed in and after about 3350 hours storage in air at 100% relative humidity at room temperature.

|  | Capacitance, mf. | Dissipation Factor, percent |
|---|---|---|
| Measurements after 96 hrs. stand after sealing | 107 | 1.5 |
| Measurements after 3,350 hrs. stand in 100% relative humidity | 106 | 1.1 |

From the above results it will be observed that the capacitance soon came to a stabilized value while the dissipation factor gradually improved (lowered) over a period of time even though subjected to a high humidity environment.

It is known that substantially all organic plastics and resins transmit moisture vapor and the epoxy resin seal used here is no exception. From the results obtained, it appears that as moisture permeated the resin seal it was sequestered by the barium oxide of the getter means.

In another test 5 units of a nominal rating of 40 microfarads were made and evaluated as above noted. The measurements are as folows:

| Unit No. | After humidity exposure | After sealing and 96 hr. stand | After 3,350 hrs. stand in 100% R.H. |
|---|---|---|---|
| 1 | 47 mf., 2.4% D.F. | 44 mf., 2.8% D.F. | 42.7 mf., 1.7% D.F. |
| 2 | 46 mf., 2.5% D.F. | 43.5 mf., 2.1% D.F. | 42.5 mf., 1.6% D.F. |
| 3 | 46.2 mf., 2.5% D.F. | 43 mf., 2.3% D.F. | 42 mf., 1.6% D.F. |
| 4 | 46.8 mf., 2.5% D.F. | 44.2 mf., 2.3% D.F. | 43 mf., 1.6% D.F. |
| 5 | 46.2 mf., 3.2% D.F. | 42.8 mf., 2.6% D.F. | 42 mf., 1.9% D.F. |

From the above test data it will also be observed the capacitance rapidly approached a stabilized value while the dissipation factor imporved with time even though subjected to a high humidity environment.

In yet another experiment 6 units of nominal 15 microfarads capacitance were assembled and evaluated as noted above.

| Unit No. | After high R.H. exposure | After sealing and 96 hr. stand | After 3,350 hrs. stand in 100% R.H. |
|---|---|---|---|
| 1 | 16.4 mf., 3% D.F. | 15.3 mf., 1.9% D.F. | 15.3 mf., 1.8% D.F. |
| 2 | 17.3 mf., 3.1% D.F. | 16.2 mf., 2.3% D.F. | 16.1 mf., 2.0% D.F. |
| 3 | 16.6 mf., 3.2% D.F. | 15.3 mf., 2.2% D.F. | 15.3 mf., 1.9% D.F. |
| 4 | 17.3 mf., 3.3% D.F. | 16.0 mf., 2.1% D.F. | 16.0 mf., 2.0% D.F. |
| 5 | 16.0 mf., 3.4% D.F. | 15.7 mf., 2.3% D.F. | 15.5 mf., 2.3% D.F. |
| 6 | 17.0 mf., 4.5% D.F. | 15.6 mf., 2.2% D.F. | 15.5 mf., 2.0% D.F. |

As described hereinbefore, it is not considered necessary to employ the getter or desiccant in the form of an elastomeric solid as in the above examples. From the standpoint of stabilization of the electrical properties, equivalent results are obtained if the desiccant is applied in powder form. In this case the barium oxide, strontium oxide, or calcium oxide, singly or in combination are added directly onto and around the anode before applying the plastic or resin seal. Done in this manner, however, the desiccant must be carefully handled primarily to introduce it into the device and quickly seal same to minimize loss of desiccating capacity from expose to moisture in the air. It should be noted that the powder does not provide a good seal of mechanical support to the anode.

The present invention is not intended to be limited to the disclosure herein and changes and modifications may be made in the disclosure by those skilled in the art without departing from the spirit and scope of the novel concepts of this invention. Such modifications and variations are considered to be within the purview and the scope of this invention and the appended claims.

Having thus described my invention, I claim:

1. A non-hermetically sealed electrolyte capacitor comprising:
    a container having a closed end, an open end, and being a cathode terminal of the capacitor;
    an anode disposed in said container with a terminal extending through its open end;
    a dielectric film covering the surface of said anode;
    a semiconductive electrolyte layer on said dielectric film;
    an electrically conductive cathode layer disposed over said semiconductive layer and electrically connected to said container;
    atmospheric control means for sequestering and neutralizing water vapor and acidic gases overlying substantially the exposed surface of said cathode layer;
    and electrically insulating means non-hermetically sealing the open end of said container and around said anode terminal.

2. A non-hermetic solid electrolyte capacitor having a moisture and acidic gas getter as claimed in claim 1, wherein said getter is a powdered alkaline earth oxide.

3. A non-hermetic solid electrolyte capacitor having a moisture and acidic gas getter as claimed in claim 1, wherein said getter is a powdered metal oxide getter selected from the group consisting of barium oxide, calcium oxide and strontium oxide, said metal oxide in intimate contact with and substantially covering said semiconductive layer of said electrode.

4. A non-hermetic solid electrolyte capacitor having a moisture and acidic gas getter as claimed in claim 1, wherein said getter includes moisture and acidic gas absorbing particles randomly dispersed in an expandible matrix.

5. A non-hermetic solid electrolyte capacitor having a moisture acidic gas getter as claimed in claim 1, wherein said getter includes metal oxide particles selected from the group consisting of barium oxide, strontium oxide and calcium oxide dispersed in an elastomeric matrix.

6. A non-hermetic solid electrolyte capacitor having a moisture and acidic gas getter as claimed in claim 5, wherein said elastomeric matrix reduces the rate at which said metal oxide particles absorb moisture and acidic gases without affecting the desiccating capacity of said metal oxide particles.

7. A non-hermetic solid electrolyte capacitor having a moisture and acidic gas getter as claimed in claim 5, wherein said elastomeric matrix is a siloxane elastomer.

8. A non-hermetic solid electrolyte capacitor having a moisture and acidic gas getter as claimed in claim 5, wherein said getter includes about 5–80 percent, by weight, of said alkaline metal oxide particles and the remainder said elastomeric matrix.

9. A non-hermetic solid electrolyte capacitor having a moisture and acidic gas getter as claimed in claim 5, wherein said alkaline earth oxide particles have a particle size of about 80 mesh or finer.

10. A non-hermetic solid electrolyte capacitor having a moisture and acidic gas getter as claimed in claim 5, wherein said elastomeric matrix is selected from the group consisting of the silicone potting resins and silicone rubbers.

11. A non-hermetic solid electrolyte capacitor having a moisture and acidic gas getter as claimed in claim 5, wherein said getter is in intimate contact with and substantially covering said semiconductive layer of said electrolyte and substantially filling the void area between said side wall of said container and said anode thereby further providing support for said anode.

References Cited

UNITED STATES PATENTS

| | | | |
|---|---|---|---|
| 1,764,770 | 6/1930 | André | 317—233 |
| 1,800,500 | 11/1931 | André | 317—233 |
| 1,830,501 | 11/1931 | André | 317—233 |
| 1,845,067 | 2/1932 | Weaver | 317—233 |
| 3,036,249 | 5/1962 | Hall | 317—230 |
| 3,297,918 | 1/1967 | Booe | 317—230 |

JAMES D. KALLAM, Primary Examiner

U.S. Cl. X.R.

317—234, 242